United States Patent
Kann

(10) Patent No.: US 10,880,631 B2
(45) Date of Patent: Dec. 29, 2020

(54) WIRELESS BINAURAL HEARING DEVICE WITH TWO CHARGING CONNECTORS AND A SYSTEM COMPRISING SUCH A HEARING DEVICE

(71) Applicant: Peter Ulrik Kann, Farum (DK)

(72) Inventor: Peter Ulrik Kann, Farum (DK)

(73) Assignee: GN Audio A/S, Ballerup (DK)

( * ) Notice: Subject to any disclaimer, the term of this patent is extended or adjusted under 35 U.S.C. 154(b) by 0 days.

(21) Appl. No.: 16/465,460

(22) PCT Filed: Feb. 6, 2018

(86) PCT No.: PCT/EP2018/052931
§ 371 (c)(1),
(2) Date: May 30, 2019

(87) PCT Pub. No.: WO2018/146088
PCT Pub. Date: Aug. 16, 2018

(65) Prior Publication Data
US 2020/0007970 A1    Jan. 2, 2020

(30) Foreign Application Priority Data

Feb. 8, 2017    (DK) .................. 2017 00081

(51) Int. Cl.
*H04R 1/10* (2006.01)
*H02J 7/00* (2006.01)
*H04R 5/033* (2006.01)

(52) U.S. Cl.
CPC .......... *H04R 1/1025* (2013.01); *H02J 7/0044* (2013.01); *H04R 1/10* (2013.01);
(Continued)

(58) Field of Classification Search
CPC ...... H04R 1/10; H04R 1/1008; H04R 1/1025; H04R 5/033; H04R 25/602;
(Continued)

(56) References Cited

U.S. PATENT DOCUMENTS 6,978,163 B2 * 12/2005 Dyer .................. A45C 11/00
                                                   370/430
9,031,254 B2    5/2015 Heise
(Continued)

FOREIGN PATENT DOCUMENTS

EP        1548911       6/2005
WO    WO 2006/126881   11/2006

OTHER PUBLICATIONS

International Search Report and Written Opinion for international patent application No. PCT/EP2018/052931 dated Apr. 19, 2018.

*Primary Examiner* — Huyen D Le
(74) *Attorney, Agent, or Firm* — Hamre, Schumann, Mueller & Larson, P.C.

(57) ABSTRACT

A wireless binaural hearing device (1; 101) comprising a first earphone (2; 102), a second earphone (3; 103), a connecting device (4; 104) connecting the first earphone (2; 102) and the second earphone (3; 103) and a rechargeable battery (6). The first earphone (2; 102) comprises a first charging connector (7; 107), which is in electrical connection with the 5 rechargeable battery (6; 106), the second earphone (3; 103) comprises a second electrical connector (8; 108) which is in electrical connection with the rechargeable battery (6; 106). The hearing device (1; 101) can be a part of a system comprising a charging cradle (11; 111).

11 Claims, 7 Drawing Sheets

(52) U.S. Cl.
CPC ......... *H04R 1/1008* (2013.01); *H04R 1/1066* (2013.01); *H04R 5/033* (2013.01); *H04R 2201/107* (2013.01); *H04R 2225/31* (2013.01)

(58) Field of Classification Search
CPC .......... H04R 2201/107; H04R 2225/31; H04R 1/1066; H02J 7/0044
USPC ............... 381/315, 323, 370, 371, 375, 374; 320/107, 108, 114
See application file for complete search history.

(56) References Cited

U.S. PATENT DOCUMENTS

2005/0212479 A1* 9/2005 Tsunoda ................ H02J 7/0044
320/114
2016/0359355 A1 12/2016 Schoene et al.

* cited by examiner

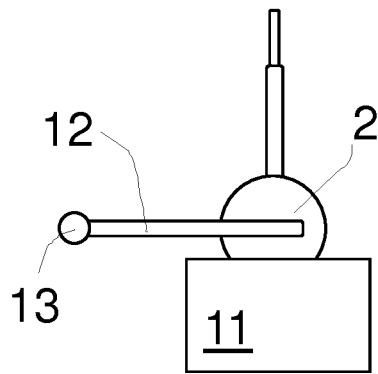
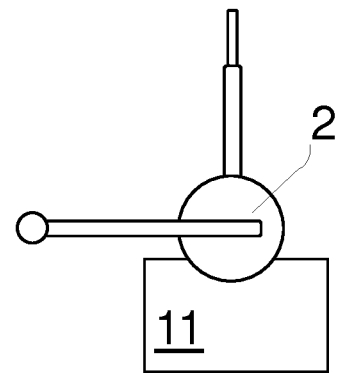
*Fig. 5*     *Fig. 6*
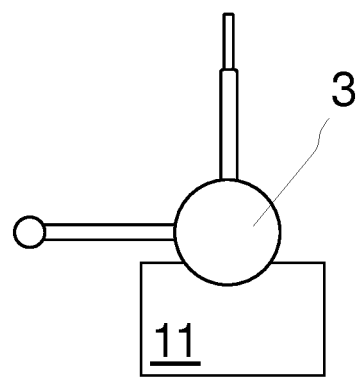
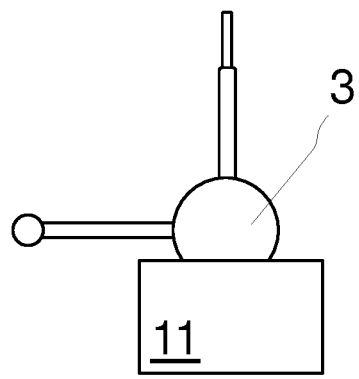
*Fig. 7*     *Fig. 8*

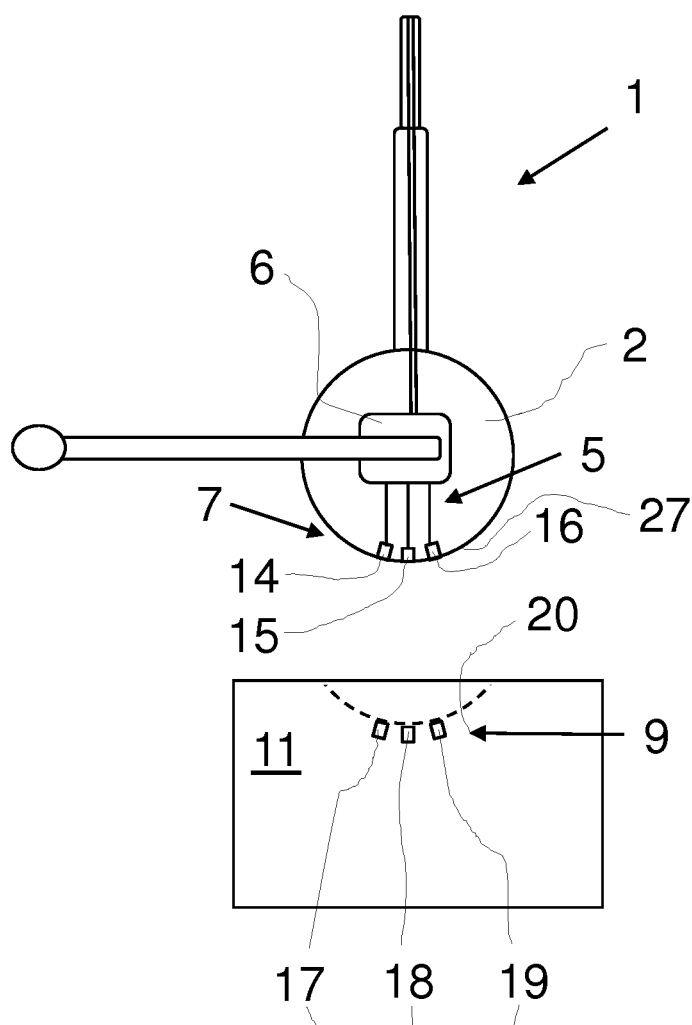
*Fig. 10*
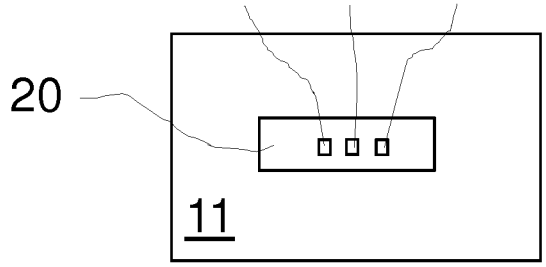
*Fig. 11*
*Fig. 12*
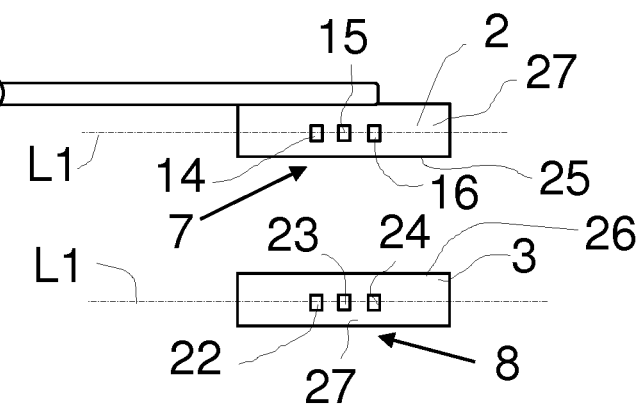
*Fig. 13*
*Fig. 14*

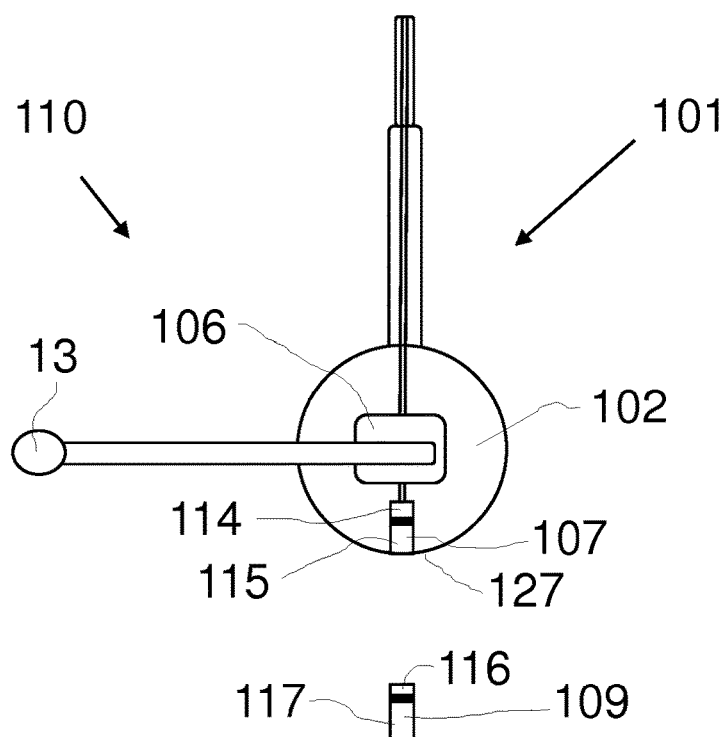
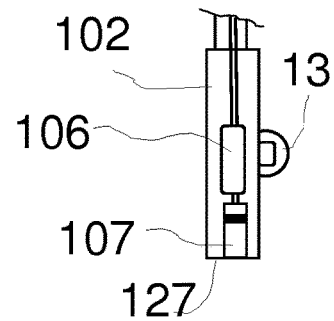
Fig. 18
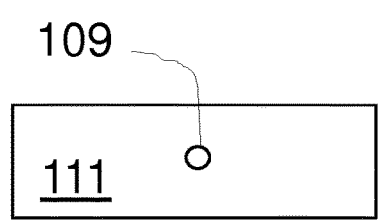
Fig. 15
Fig. 16
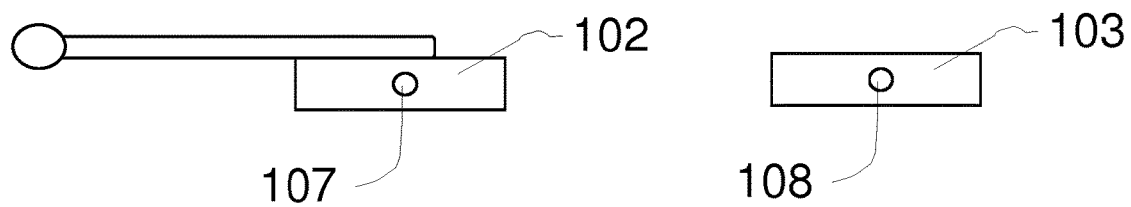
Fig. 17

WIRELESS BINAURAL HEARING DEVICE WITH TWO CHARGING CONNECTORS AND A SYSTEM COMPRISING SUCH A HEARING DEVICE

TECHNICAL FIELD

The invention relates to a wireless binaural hearing device comprising a first earphone, a second earphone, a connecting device connecting the first earphone and the second earphone, a rechargeable battery, wherein the first earphone comprises a first charging connector, which is in electrical connection with the rechargeable battery. The invention further relates to a wireless binaural hearing system comprises such a hearing device and a charging cradle adapted to receive either of the first earphone and the second earphone in a charging position.

BACKGROUND ART

Wireless binaural headsets and headphones are widely used today. Binaural headsets and headphones comprise two earphones, one for each ear. Jabra Pro 9450 Duo is wireless binaural headset system with a headset comprising a first earphone, a second earphone, a rechargeable battery, and a base comprising a charging cradle. The headset's first earphone comprises a headset charging connector, and the charging cradle comprises a corresponding charging connector, which connects to the headset's charging connector when the first earphone is received in a charging position in the charging cradle. The user must place the first earphone in the charging cradle in one specific position each time and this can be somewhat cumbersome, especially if the charging cradle is just within reach of the user.

DISCLOSURE OF INVENTION

A wireless binaural hearing device according to the invention comprises a first earphone, a second earphone, a connecting device connecting the first earphone and the second earphone, a rechargeable battery, wherein the first earphone comprises a first charging connector, which is in electrical connection with the rechargeable battery, and wherein the second earphone comprises a second electrical connector which is in electrical connection with the rechargeable battery. Thus, the user may select which earphone he prefers to connect to a charger, and the choice may depend on whether he is left handed or right handed and whether the charger is placed to the left or right of the user.

The hearing device may be a two-way communication headset comprising at least one microphone.

The wireless binaural hearing device may comprise a wireless transceiver, such as a Bluetooth transceiver or a DECT transceiver.

According to an embodiment, the first and second earphones comprise an earphone housing wall, and that the first and second electrical connectors are arranged at the earphone housing wall of the first and second earphones.

The invention also relates to a wireless binaural hearing device system comprising a hearing device according of the type described above and a charging cradle adapted to receive either of the first earphone and the second earphone in a charging position, and where the charging cradle further comprises a cradle charging connector adapted to be connected to the first charging connector, when the first earphone is a the charging position, and the second charging connector, when the second earphone is in a charging position.

According to an embodiment, the cradle, the first and second earphones and the charging connectors are adapted, such that the first and second earphone can be positioned with different orientations in a charging position.

According to an embodiment, the charging cradle, the first earphone and the second earphone are adapted such that the first earphone and the second earphone can be positioned in a charging position in two different directions, which are 180 degrees displaced about a vertical axis.

According to an embodiment, the first and the second earphones each has a first side face facing the ear of a user during use, wherein the first charging connector, the second charging connector and the cradle charging connector comprises contacts that are arranged side by side on a line that is parallel with the first side in a charging position.

According to an embodiment, the first and second charging connectors are embodied as cylindrical sockets, and the cradle charging connector is embodied as a cylindrical plug, which can be rotatably received in the first and second charging connectors in a charging position.

The cylindrical plug may comprise contacts or poles along the axial length, which are divided by insulation rings. According to another embodiment, the plug can be a coaxial plug or barrel connector comprising a radially inner contact and a radially outer contact.

According to an embodiment, the cradle charging connector is embodied as a cylindrical socket, and the first and second charging connectors are embodied as cylindrical plugs, which can be rotatably received in the cradle charging connector in a charging position.

According to an embodiment, the hearing device and the charging cradle each comprises a radio transceiver for providing a radio link between the hearing device and the charging cradle.

BRIEF DESCRIPTION OF THE DRAWINGS

The invention is explained in detail below with reference to the drawing illustrating embodiments of the invention and in which:

FIG. 5 is a schematic left side view of the binaural hearing system in the first charging position, FIG. 6 is a schematic left side view of the binaural hearing system in the second charging position, FIG. 7 is a schematic left side view of the binaural hearing system in the third charging position, FIG. 8 is a schematic left side view of the binaural hearing system in the fourth charging position, FIG. 10 is a schematic left side view of the headset, FIG. 11 is a schematic left side view of the charging cradle, FIG. 12 is a schematic top view of the charging cradle, FIG. 13 is a schematic bottom view of a first earphone of the headset, FIG. 14 is a bottom view of a second earphone of the headset, FIG. 15 is a schematic left side view of a second embodiment of a binaural hearing system according to the invention where the headset is lifted from a first charging position, FIG. 16 is a top view of the charging cradle of the second embodiment, FIG. 17 are schematic bottom views of the first and second earphones of the headset of the second embodiment, FIG. 18 is a schematic front view of the first earphone of the headset of the second embodiment.

MODES FOR CARRYING OUT THE INVENTION

Figure 1:
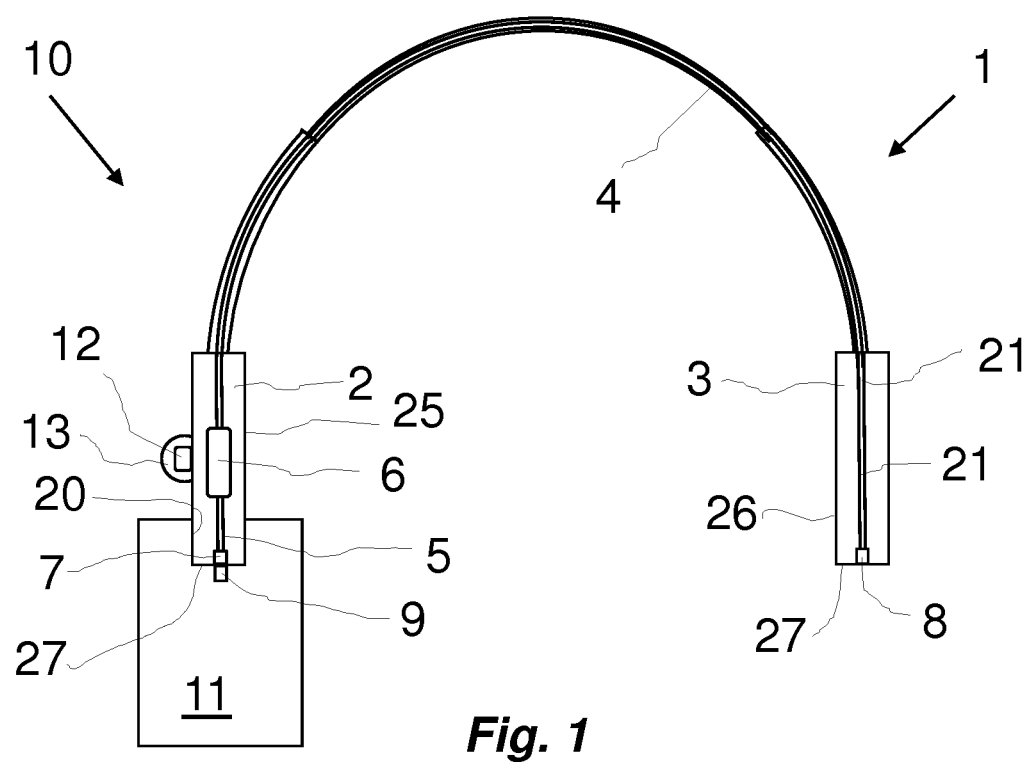
FIG. 1 is a schematic front view of a binaural hearing device system according to the invention in a first charging position.

FIG. 1 is a schematic front view of a binaural hearing device system 10 according to the invention in a first charging position. The binaural hearing system is a wireless headset system 10 comprising a wireless headset 1 and a charging cradle 11. The wireless headset 1 comprises a first earphone 2, a second earphone 3 and a headband 4 connecting the first earphone 2 and the second earphone 3. The first earphone 2 has a side 25 facing the user's ear during use, and the second earphone 3 has a side 26 facing the user's other ear during use. A rechargeable battery 6 is provided in the first earphone 2. The first earphone 2 comprises in an earphone housing wall 27 a first charging connector 7, which by means of a first electrical wiring 5 is connected with the rechargeable battery 6. An earphone housing wall 27 of the second earphone 3 comprises a second electrical connector 8, which by means of a second electrical wiring 21 extending through the second earphone 3 and the headband 4 also is connected to the rechargeable battery 6 in the first earphone 2. A microphone arm 12 extends from the first earphone 2 and has a microphone 13 at its free end. Components, which are not necessary to explain the invention, are left out from the description. These components are f. ex. transceiver, antenna, digital signal processing circuits, speakers etc. The charging cradle 11 has in its top surface a single cradle recess 20 that can receive the first earphone 2 or the second earphone 3 for charging. A single cradle charging connector 9 is provided in the bottom of the cradle's recess 20 and is in electrical contact with the first charging connector 7. The charging cradle 11 is connected to a not shown external power supply. Thus, the rechargeable battery 6 can be recharged in the first charging position shown in FIG. 1. Wiring and other components of the charging cradle 11 are not shown for clarity purposes. The charging cradle 11 comprises a not-shown transceiver, by means of which it can create a radio link with the corresponding transceiver in the headset 1. The radio standard used could be Bluetooth or DECT.

Figure 2:
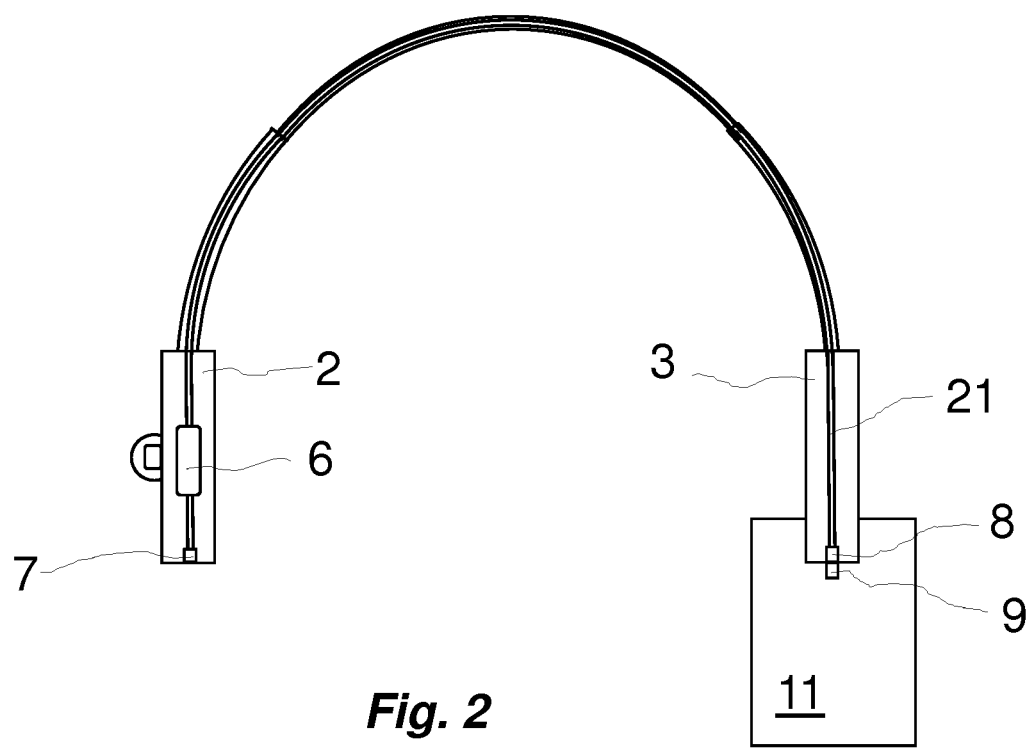
FIG. 2 is a schematic front view of the binaural hearing system in a second charging position.

FIG. 2 is a schematic front view of the binaural hearing system in a second charging position, in which the second earphone 3 is received in the cradle recess 20. As the second charging connector 8 of the second earphone 3 is connected by the second electrical wiring 21 to the rechargeable battery 6, the latter can also be charged in this charging position.

Figure 3:
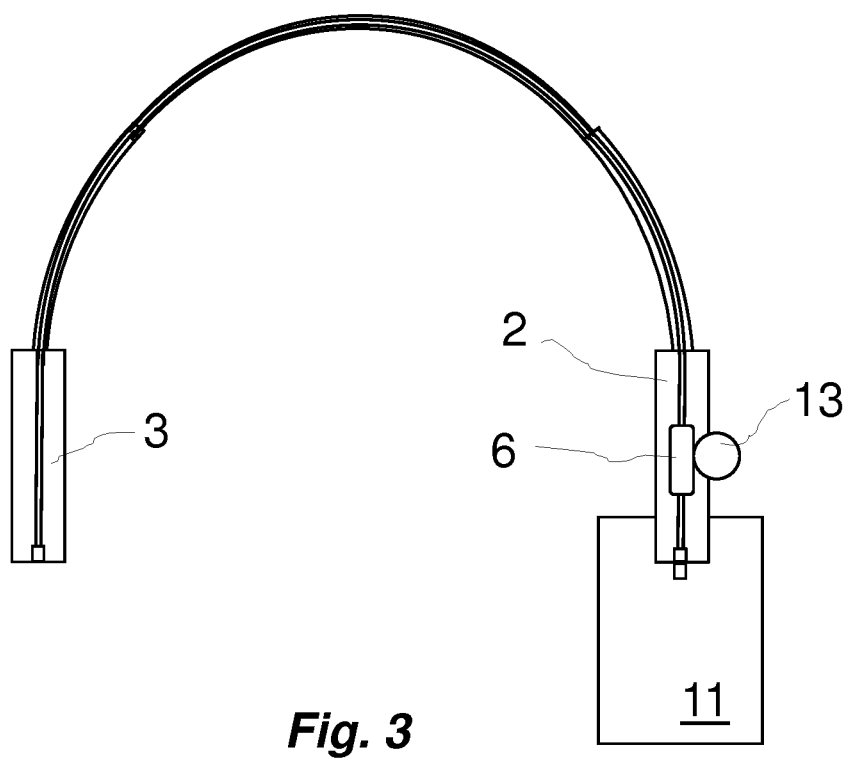
FIG. 3 is a schematic front view of the binaural hearing system in a third charging position.

FIG. 3 is a schematic front view of the binaural hearing system in a third charging position. In this position, the headset 1 is rotated 180 degrees about a vertical axis compared to the first and second charging positions shown in FIG. 1 and FIG. 2. The first earphone 2 is received in the cradle recess 20 of the charging cradle 11.

Figure 4:
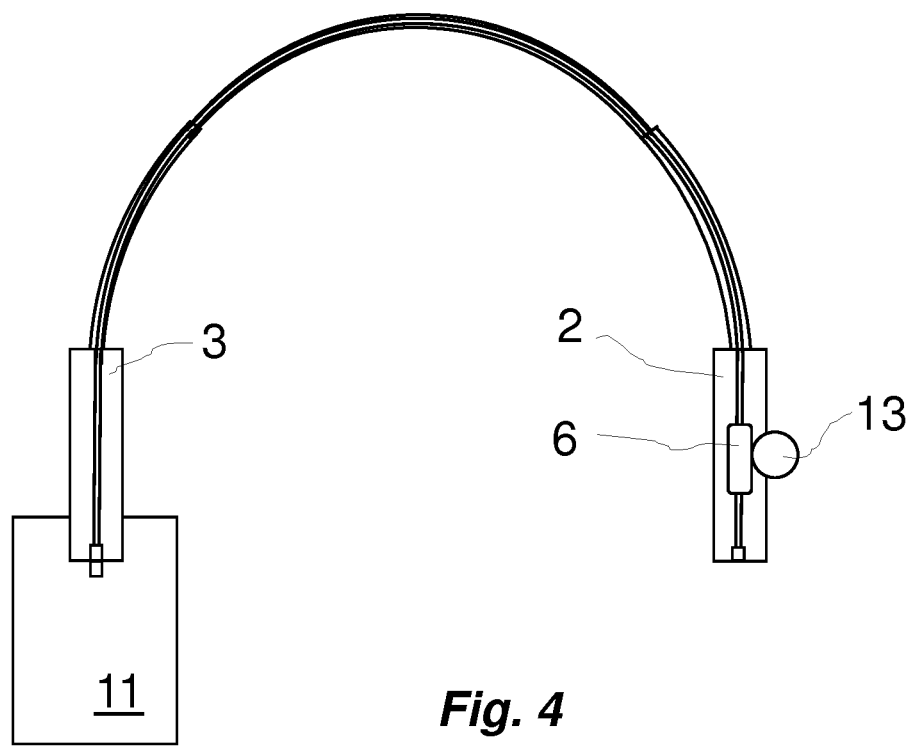
FIG. 4 is a schematic front view of the binaural hearing system in a fourth charging position.

FIG. 4 is a schematic front view of the binaural hearing system in a fourth charging position, in which the headset 1 is oriented as in FIG. 3, but where the second earphone 3 is received in the cradle recess 20 of the charging cradle 11.

FIG. 5 is a schematic left side view of the binaural hearing system in the first charging position, in which the first earphone 2 is received by the charging cradle 11.

FIG. 6 is a schematic left side view of the binaural hearing system in the second charging position, in which the second earphone 3 is received by the charging cradle 11.

FIG. 7 is a schematic left side view of the binaural hearing system in the third charging position, in which the first earphone 2 is received by the charging cradle 11.

FIG. 8 is a schematic left side view of the binaural hearing system in the fourth charging position, in which the second earphone 3 is received by the charging cradle 11.

Figure 9:
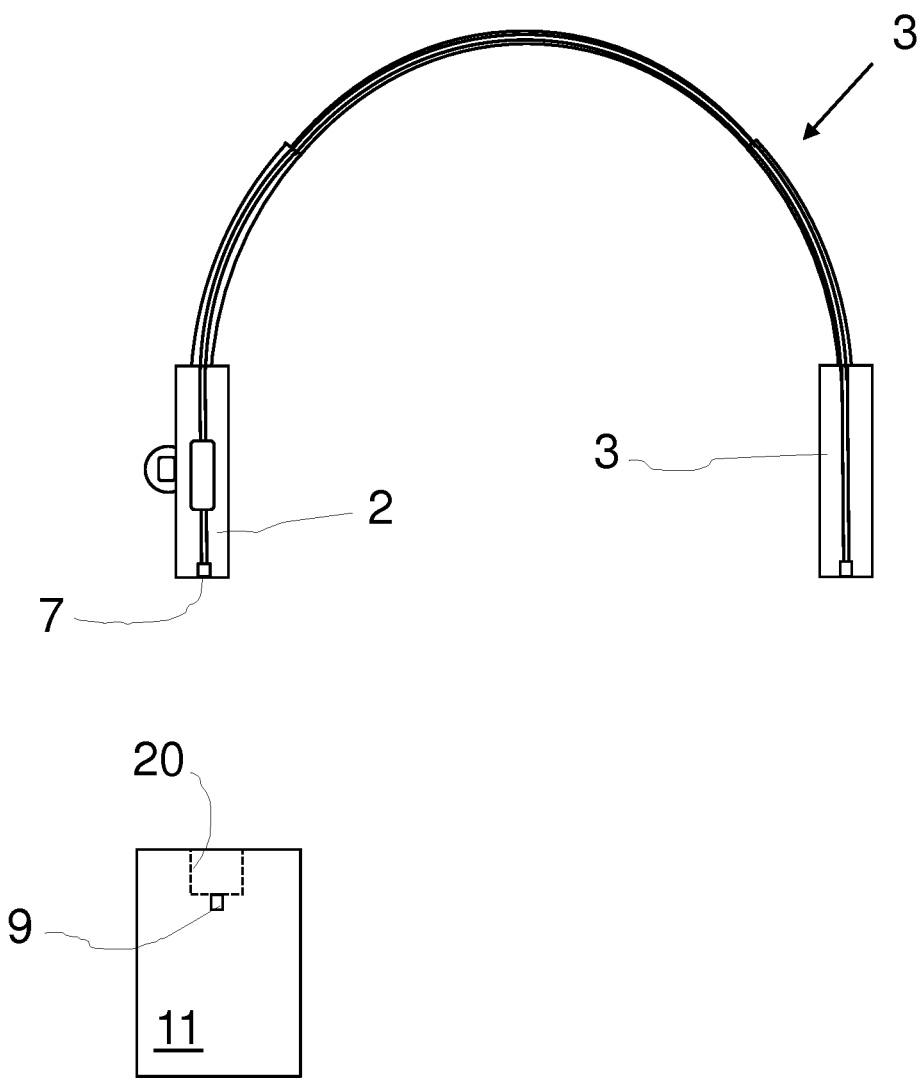
FIG. 9 is a schematic front view of the binaural hearing system with a headset removed from a charging cradle.

FIG. 9. Is a schematic front view of the binaural hearing system with the headset 1 removed from the charging cradle 11.

FIG. 10 is a schematic left side view of the headset 1. The rechargeable battery 6 is connected by wiring 5 to the first charging connecter 7, which comprises a first contact 14, a second contact 15 and a third contact 16.

FIG. 11 is a schematic left side view of the charging cradle 11. The cradle charging connector 9 comprises a first contact 17, a second contact 18 and a third contact 19. When the hearing system is in the first charging position, the first contact 14 of the first charging connector 7 is in electrical contact with the first contact 17 of the cradle charging connecter 9, the second contact 15 of the first charging connector 7 is in electrical contact with the second contact 18 of the cradle charging connecter 9, and the third contact 16 of the first charging connector 7 is in electrical contact with the third contact 19 of the cradle charging connecter 9. In this embodiment, the first and third contacts 14, 16 of the first charging connector 7 and the first and third contacts 17, 19 of the cradle charging connector 9 are all connected to +, while the second connectors 15, 18 of the first charging connector 7 and the cradle charging connector 9 are both connected to GND. Thus, correct electrical coupling will be obtained no matter whether the hearing system 10 is in the first or third charging positions. In the third charging position, the first contact 17 of the cradle charging connector 9 will be in contact with the third contact 16 of the first charging connector 7, and the third contact 19 of the cradle charging connector 9 will be in contact with the first contact 14 of the first charging connector 9. As shown in FIG. 14, the second charging connector 8 of the second earphone 3 also comprises a first contact 22, a second contact 23 and a third contact 24. These contacts are connected in the same way as the contacts of the first charging connector 7, so correct electrical coupling for charging will also be obtained in the second and fourth charging positions.

FIG. 12 is a schematic top view of the charging cradle 11. The cradle recess 20 and the contacts 17, 18 and 19 are symmetric like the first and second earphones 2, 3 and their contacts 14, 15, 16, 22, 23, 24, whereby each of the earphones 2, 3 can be received in the cradle recess 20 in two directions which are 180 degrees displaced.

FIG. 13 is a schematic bottom view of the headset 1, and FIG. 14 is a bottom view of the second earphone 3. The contacts 14, 15, 16 of the first charging connector 7 are aligned side by side along a first line L1, which is parallel with the first side 25 of the first earphone 2.

Likewise, the contacts 22, 23, 24 are aligned side by side along a second L2, which is parallel with the first side 26 of the second earphone 3.

In an alternative embodiment, any two of the three contacts of all the connectors may be connected to + and ground respectively, whereby the third contact may be used for transferring data. In this case, electronics in the headset or the charging cradle will route +, ground and data correct, when the headset is arranged in the cradle.

FIGS. 15-20 disclose a second embodiment of a binaural hearing system 110 according to the invention. This embodiment differs from the first embodiment by the connectors. The first connector 107 of the first earphone 102 and the second connector 108 of the second earphone 103 are both shaped as a two-pole cylindrical socket. The cradle charging connector 109 of the charging cradle 111 is embodied as a two-pole cylindrical plug. This embodiment has the advantage, that the headset 101 can be received by the charging cradle 111 in an infinite number of charging positions, as the first or second earphone 102, 103 can rotate 360 degrees, when the cradle charging connector 109 is inserted into one of them. The first connector 107 comprises a first contact 114 and a second contact 115. The cradle charging connector 109 comprises a first contact 116 and a second contact 117. When the first connector 107 and the cradle charging connector 109 are connected, the first contacts 114, 116 are in electrical contact with each other, and the second contacts 115, 117 are in electrical contact with each other, whereby the rechargeable battery 106 can be recharged. The second connector 108 has similar contacts.

Figure 19:
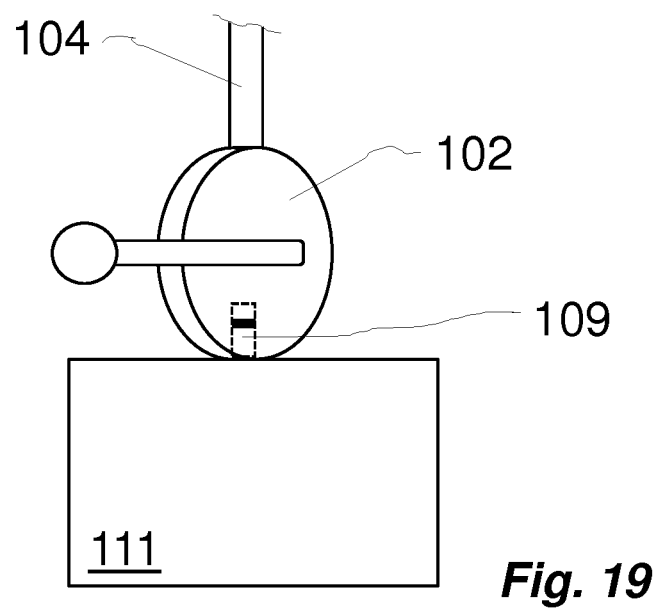
FIG. 19 is a schematic side view of the second embodiment of the binaural hearing system in an angled charging position.
Figure 20:
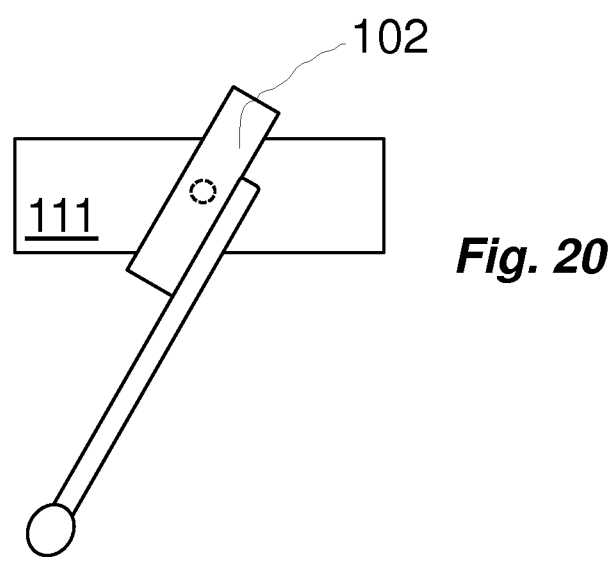
FIG. 20 is a schematic top view of the second embodiment of the binaural hearing system in an angled charging position.

FIG. 19 is a schematic side view of the second embodiment of the binaural hearing system in an angled charging position, and FIG. 20 is a schematic top view of the same. Due to the cylindrical shape of the connectors 107, 108, 109, the headset 101 can rotate freely about the vertical axis of the cradle charging connector.

In a not-shown charging position, the cradle charging connector 109 is inserted into the second socket shaped charging connector 108 of the second earphone 103.

In an alternative embodiment, the first and second charging connectors are embodied as plugs and the cradle charging connector embodied as a socket.

In the embodiments shown here the charging cradle 11 has only one cradle charging connector 9; 109, which can receive either the first charging connector 7; 107 or the second charging connector 8; 108. It must off course be ensured, that the charging cradle is stable enough to not tilt due to the moment caused by weight of the headband and the earphone, which is not received by the charging cradle 11.

The invention is not limited to the embodiments shown here.

REFERENCE SIGNS 1 headset
2 first earphone
3 second earphone
4 headband
5 first electrical wiring
6 chargeable battery
7 first charging connector
8 second charging connector
9 cradle charging connector
10 headset system
11 charging cradle
12 microphone arm
13 microphone
14 first contact of first charging connector
15 second contact of first charging connector
16 third contact of first charging connector
17 first contact of cradle charging connector
18 second contact of cradle charging connector
19 third contact of cradle charging connector
20 cradle recess
21 second electrical wiring
22 first contact of second charging connector
23 second contact of second charging connector
24 third contact of second charging connector
25 first side of first earphone
26 first side of second earphone
27 earphone housing wall

The invention claimed is:

1. A wireless binaural hearing device for use with a charging cradle having a single charging port, said device comprising:
a first earphone, a second earphone, a connecting device connecting the first earphone and the second earphone, a rechargeable battery, wherein the first earphone includes a first charging connector and an electrical conductor running from said first charging connector along said connecting device to the rechargeable battery,
wherein the second earphone includes a second charging connector and an electrical conductor running from said second charging connector along said connecting device to the rechargeable battery and wherein the first and second earphones include comprise an earphone housing wall, and that the first and second charging connectors are arranged at the earphone housing wall of the first and second earphones and whereby the hearing device can be recharged at said single charging port via said first or second charging connection.

2. A wireless binaural hearing device according to claim 1, wherein the hearing device is a two-way communication headset and where said connecting device is a head band and wherein one of said conductors runs through said head band.

3. A wireless binaural hearing device according to claim 1 comprising a wireless transceiver.

4. A wireless binaural hearing device system comprising a hearing device according to claim 1 and the charging cradle adapted to receive either of the first earphone and the second earphone in a charging position, and where the charging cradle further comprises a single cradle charging connector adapted to be connected to the first charging connector, when the first earphone is in the charging position, and the second charging connector, when the second earphone is in the charging position.

5. A wireless binaural hearing device system according to claim 4, wherein the charging cradle, the first and second earphones and the charging connectors are adapted, such that the first and second earphone can be positioned with different orientations in a charging position.

6. A wireless binaural hearing device system according to claim 4, wherein the charging cradle, the first earphone and the second earphone are adapted such that the first earphone and the second earphone can be positioned in a charging position in two different directions, which are 180 degrees displaced about a vertical axis.

7. A wireless binaural hearing system according to claim 4, wherein the first and the second earphones each has a first side face facing the ear of a user during use, and wherein the first charging connector, the second charging connector and the cradle charging connector comprise contacts that are arranged side by side along a first line L1 that is parallel with the first side.

8. A wireless binaural hearing device system according to claim 4, wherein the first and second charging connectors are embodied as cylindrical sockets, and the cradle charging connector is embodied as a cylindrical plug, which can be rotatably received in the first and second charging connectors in a charging position.

9. A wireless binaural hearing device system according to claim 4, wherein the cradle charging connector is embodied as a cylindrical socket, and the first and second charging connectors are embodied as cylindrical plugs, which can be rotatably received in the cradle charging connector in a charging position.

10. A wireless binaural hearing device system according to claim 4, wherein the hearing device and the charging cradle each comprises a radio transceiver for providing a radio link between the hearing device and the charging cradle.

11. A wireless binaural hearing system comprising:
a binaural headset having a first right earphone, a second left earphone, a connecting device connecting the first earphone and the second earphone, a rechargeable battery;
wherein the first earphone includes a first charging connector and an electrical conductor running from the first charging connector along said connecting device to the rechargeable battery;
wherein the second earphone includes-a second charging connector and an electrical conductor running from the second charging connector along said connecting device to the rechargeable battery;
wherein the first and second earphones include an earphone housing wall, and that the first and second charging connectors are arranged at the earphone housing wall of the first and second earphones;
a charging base having a charging port sized to receive said via said first or second charging connection;
so that the headset can be recharged by placing either the first or second charging connector into said charging port.

* * * * *